(12) United States Patent
Lee et al.

(10) Patent No.: US 6,611,219 B1
(45) Date of Patent: Aug. 26, 2003

(54) OVERSAMPLING DATA RECOVERY APPARATUS AND METHOD

(75) Inventors: Chu-Hua Lee, Hsinchu (TW); Pi-Fen Chen, Hsinchu (TW)

(73) Assignee: Macronix International Co., Ltd., Hsinch (TW)

( * ) Notice: Subject to any disclaimer, the term of this patent is extended or adjusted under 35 U.S.C. 154(b) by 0 days.

(21) Appl. No.: 10/136,551

(22) Filed: May 1, 2002

(51) Int. Cl.$^7$ ................................................. H03M 1/00
(52) U.S. Cl. ........................................ 341/141; 375/355
(58) Field of Search .............................. 341/141, 143, 341/111, 122, 123, 115, 142

(56) References Cited

U.S. PATENT DOCUMENTS 5,761,254 A * 6/1998 Behrin ........................ 375/355
5,905,769 A * 5/1999 Lee et al. .................... 375/376
6,266,799 B1 * 7/2001 Lee et al. ........................ 716/6
6,272,193 B1 * 8/2001 Eglit ............................ 375/355

* cited by examiner

Primary Examiner—Brian Young
Assistant Examiner—John Nguyen
(74) Attorney, Agent, or Firm—Stout, Uxa, Buyan & Mullins, LLP

(57) ABSTRACT

An open-loop data recovery apparatus and method utilizing an oversampling technique is provided, by which the occurrence of data transitions is counted and a proper sampling clock phase is decided. Counters with variable thresholds are used to monitor the occurrence of phase transitions for a phase selection circuit to determine a preferred phase for recovery of sampled data. The thresholds of the counters are further adjusted in reference with the preferred phase decided by the phase selection circuit.

24 Claims, 4 Drawing Sheets

OVERSAMPLING DATA RECOVERY APPARATUS AND METHOD

BACKGROUND OF THE INVENTION

1. Field of the Invention

The present invention relates to reconstructing data using an oversampling technique, and more specifically, to selecting the proper phase or samples to reconstruct the data.

2. Description of Related Art

Many of today's electronic devices, such as digital signal processors, require precise timing for proper operation. Typically, a master clock, generated from a crystal oscillator, supplies a timing signal to clock various components of a circuit or device. A second or slave clock signal is also generated. As these clock signals propagate through the circuit, the signals can become skewed. Clock skew can have adverse effects on the operation of the circuit. For example, when sampling a serial data stream, a skewed clock signal would sample portions of the data stream that are not in phase with the true clock, i.e., the sampling time does not coincide with the corresponding time of the actual data. This can cause inaccurate data being reproduced or recovered. Clock skew can be caused by such factors as the resistance and capacitance (RC) transmission delay variations, device. variations, and-localized loading variations. These can include variations in the length and/or density of the wires carrying the clock signals.

Many solutions have been proposed and used to minimize the effects of clock skew on reproduced data. One such solution is to oversample the serial data stream at a frequency higher than the data rate, using a multi-phase clock signal. Sampling occurs at each phase of the clock. Thus, oversampling provides multiple samples during each data interval. Some samples will be in error, caused by the clock skew, while other samples will be an accurate sample of the data. Proper selection of the samples for each data interval will achieve an accurately recovered data signal. Different schemes for the selection are known, such as disclosed in U.S. Pat. No. 5,905,769, entitled "System and Method for High-Speed Skew-Insensitive Multi-Channel Data Transmission" to Lee et al. and U.S. Pat. No. 6,266,799, entitled "Multi-Phase Data/Clock Recovery Circuitry and Methods for Implementing Same" to Lee et al., both of which are incorporated by reference in their entirety.

However, these schemes can have fixed thresholds for determining which phase of the clock or data samples is selected. Since both the serial data stream and clock skews vary over time and operation, fixed thresholds may not allow optimal settings for every condition. This problem can reduce the performance of the circuit during these conditions.

Accordingly, in order to overcome the disadvantages discussed above in connection with conventional fixed-threshold techniques, methods are needed for accurately recovering data from oversampling serial data streams.

SUMMARY OF THE INVENTION

In accordance with one aspect of the invention, a method and apparatus utilizing an oversampling technique is provided where samples are selected based on detecting data transitions and determining phases or samples corresponding to a majority of the transitions. The majority determination is made using counters having variable thresholds. As a result, phases, and therefore samples, can be correctly selected to accurately recover data for varying conditions.

In accordance with an aspect of the present invention, an open-loop data recovery apparatus and method utilizing an oversampling technique is provided, by which the occurrence of data transitions is counted and a proper sampling clock phase is decided. Counters with variable thresholds are used to monitor the occurrence of phase transitions for a phase selection circuit to determine a preferred phase for recovery of sampled data. The thresholds of the counters are further adjusted in reference with the preferred phase decided by the phase selection circuit. By adjusting the thresholds of the counters, the low pass effect of counters, which can be seen as one digital loop filter, can be optimally determined.

In one embodiment, a data recovery system includes a data sampler that oversamples an incoming serial data stream. The sampling is at a rate controlled by a multi-phase clock having a frequency higher than the data rate. In a first embodiment, the clock is a 12-phase clock having a frequency 2.5 times the data rate. In a second embodiment, the clock is a 20-phase clock having a frequency two times the data rate. Thus, at each data interval, the data sampler outputs a plurality of samples. Further, in accordance with one aspect of the present invention, the phases are divided into groups, with the number of groups equal to the number of samples per data interval or data bit. For example, in the first embodiment, if a data frame has ten data bits, there will be three samples per bit or data interval, resulting in each bit being three-times oversampled and three groups of samples (totaling 12 samples) in a 12-phase clock cycle. The first group can comprise samples corresponding to phases 3, 6, 9 and 12; the second group can comprise samples corresponding to phases 1, 4, 7 and 10; and the third group can comprise samples corresponding to phases 2, 5, 8 and 11. In the second embodiment, if the data frame has ten data bits, there will be four samples per bit, resulting in each bit being four-times oversampled and four groups of samples (i.e., 20 samples) in a 20-phase clock cycle.

Also, the number of samples in each group is equal to the number of data intervals in a clock cycle. Thus, within each group, there is a sample corresponding to each data interval. Therefore, each group contains a sufficient number of samples so that, if aligned, those samples could be used to recover the serial data stream during one clock cycle.

The output of the data sampler is coupled to a phase decision circuit. The phase decision circuit detects data transitions. In one embodiment, an exclusive OR (XOR) operation is performed on each sample and its adjacent and subsequent sample to yield transition values. The last sample in a clock cycle is XOR'd with the first sample from the next clock cycle. These transition values are then divided into groups, with the number of groups equal to the number of multiple phases divided by the number of samples per data bit. For example, in the first embodiment, if a data frame has ten data bits, there will be three samples per bit or data interval, resulting in each bit being three-times oversampled and four groups. In the second embodiment, if the data frame has ten data bits, there will be four samples per bit, resulting in each bit being four-times oversampled and five groups. The grouped transition values are then counted to determine which of the groups of samples or phases correspond to the highest transition count. A count is incremented, in one embodiment, when a result indicates a data transition, and in another embodiment, when either one of two adjacent results indicates a data transition. A counter corresponding to that group is incremented, and the samples of the next clock cycle are processed. Processing continues until one counter reaches a threshold, indicating that a group of samples or phases corresponding to that counter is to be selected. This threshold and selection criteria can be varied, according to different embodiments.

In one embodiment, there are three counters, each counter having two thresholds. Initially, the first threshold is set to the binary value of the second threshold shifted right one bit. For example, if the second threshold is set as 13, which is binary 1101, then the first threshold will be set as 4, which is binary 0100. Selection of a group of samples goes to the first counter that reaches the second threshold before any other counter reaches the first threshold. In other words, the group of samples or phases corresponding to that first counter will be used. When a group of samples is chosen, the counters are cleared, and the first threshold is shifted right one bit (e.g., 0100→0010). However, if two counters reach the first threshold before any one counter reaches the second threshold, then a group of samples is selected depending on which counter first reached the first threshold. Once the group is selected, the counters are cleared. If the circuit changes phase (i.e., changes groups of samples) three times in series, the process will be restarted with the first threshold being reset.

The output of the phase decision circuit, which contains information on the group of samples or phases selected, is coupled to a multiplexer circuit. The samples from the data sampler are also input to the multiplexer circuit. Using information from the phase decision circuit, the multiplexer circuit selects the appropriate group of samples from the data sampler and outputs these samples. The output of the multiplexer circuit is the recovered data.

The present invention will be more fully understood when taken in light of the following detailed description taken together with the accompanying drawings.

DETAILED DESCRIPTION OF THE PRESENTLY PREFERRED EMBODIMENTS

Figure 1:
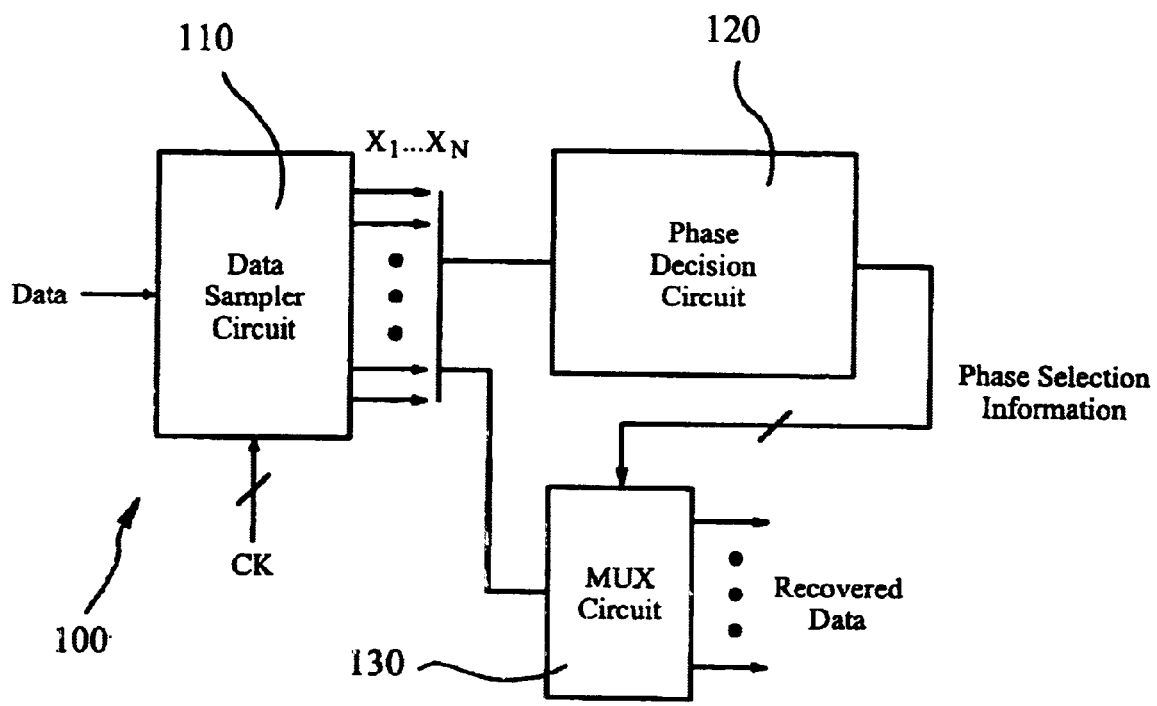
FIG. 1 is a block diagram of an open loop data recovery system according to one embodiment of the present invention.

Referring more particularly to the drawings, FIG. 1 is a block diagram of an open-loop data recovery system 100 according to one embodiment of the present invention. The system 100 includes a data sampler circuit 110, a phase decision circuit 120, and a multiplexer circuit 130. The data sampler circuit 110 is a conventional sampler that samples an incoming serial data stream according to an input clock signal. As is known in the art, a multi-phase clock signal having a plurality of phases per data interval or bit will oversample the input serial data stream.

Figure 2:
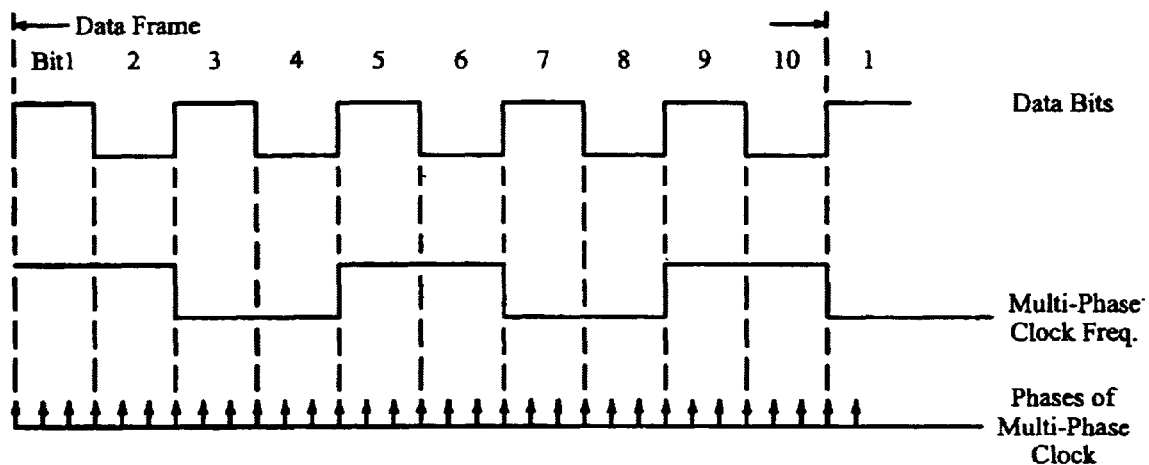
FIG. 2 shows an example of a portion of a serial data stream, along with the phases of a 12-phase clock, according to a first embodiment.

FIG. 2 shows an example of a portion of a serial data stream, along with the phases of a multi-phase clock, according to a first embodiment. Sampling occurs at each phase of the multi-phase clock. In FIG. 2, the multi-phase clock is a 12-phase clock, the serial data stream has ten bits per data frame, and the multi-phase clock frequency is 2.5 times the data rate (i.e., the data frame is sampled during 2.5 clock cycles of the multi-phase clock). Accordingly, during each clock cycle of the multi-phase clock, four out of the ten bits of the serial data stream are sampled, and each bit is sampled three times (at each phase) for a three-times oversampling. The arrows at the bottom of FIG. 2 indicate phases of the multi-phase clock and sampling points for the bits of the serial data stream. As seen, there are 12 phases or samples per clock cycle of the multi-phase clock.

Figure 3:
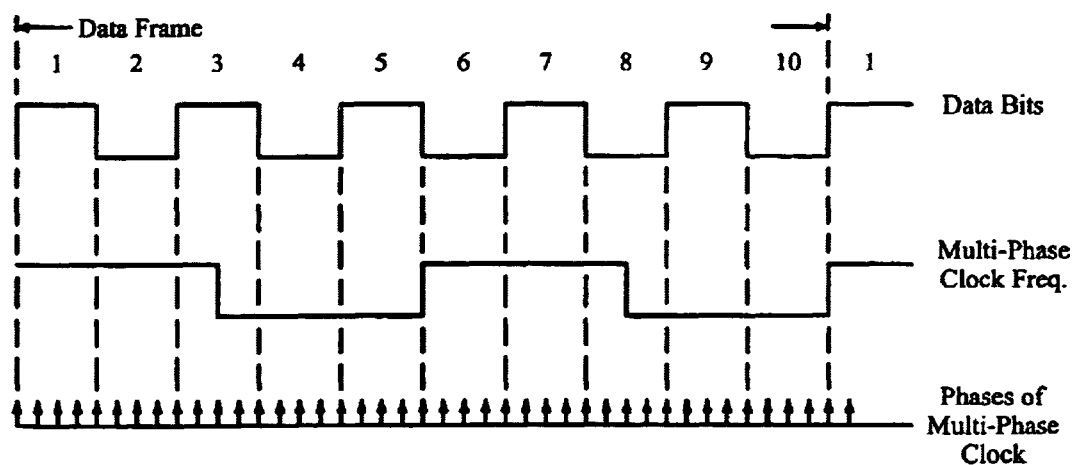
FIG. 3 shows an example of a portion of a serial data stream and phases of a 20-phase clock according to a second embodiment.

FIG. 3 shows an example of a portion of a serial data stream and phases of a multi-phase clock according to a second embodiment. In this embodiment, the multi-phase clock is a 20-phase clock, the serial data stream has ten bits per data frame (as before), and the multi-phase clock frequency is two times the data rate. With this embodiment, the data frame is sampled during two clock cycles of the multi-phase clock, so that five bits are sampled with each clock cycle of the multi-phase clock. Each bit of the serial data stream is sampled four times for a four-times oversampling. The arrows at the bottom of FIG. 3 indicate phases of the multi-phase clock and sampling points for the bits of the serial data stream (only phases or samples for the first clock cycle of the multi-phase clock are shown). As seen, there are 20 phases or samples per clock cycle of the multi-phase clock.

With clock skews, some of the samples may not be in phase with the desired data bit. Therefore, in accordance with the present invention, proper selection of which samples or phases to use to recover the data can be critical in obtaining an accurate reproduction.

Referring back to FIG. 1, the output of data sampler 110 will be a number of samples corresponding to a clock cycle of the multi-phase clock. Thus, the samples outputted from the data sampler 110 will be 12 samples for the embodiment of FIG. 2 and 20 samples for the embodiment of FIG. 3. This output from the data sampler 110 is coupled to the inputs of the phase decision circuit 120 and the multiplexer circuit 130. Alternatively, the output of data sampler 110 can be set to a number of samples corresponding to a data frame (instead of a clock cycle of the multi-phase clock), so that the data sampler 110 outputs 30 samples for the embodiment of FIG. 2 and 40 samples for the embodiment of FIG. 3. In either embodiment, the phase decision circuit 120 performs the selection of which of the samples to use for the recovered data. The multiplexer circuit 130 uses this information to select the desired samples from the data sampler 10.

Figure 4:
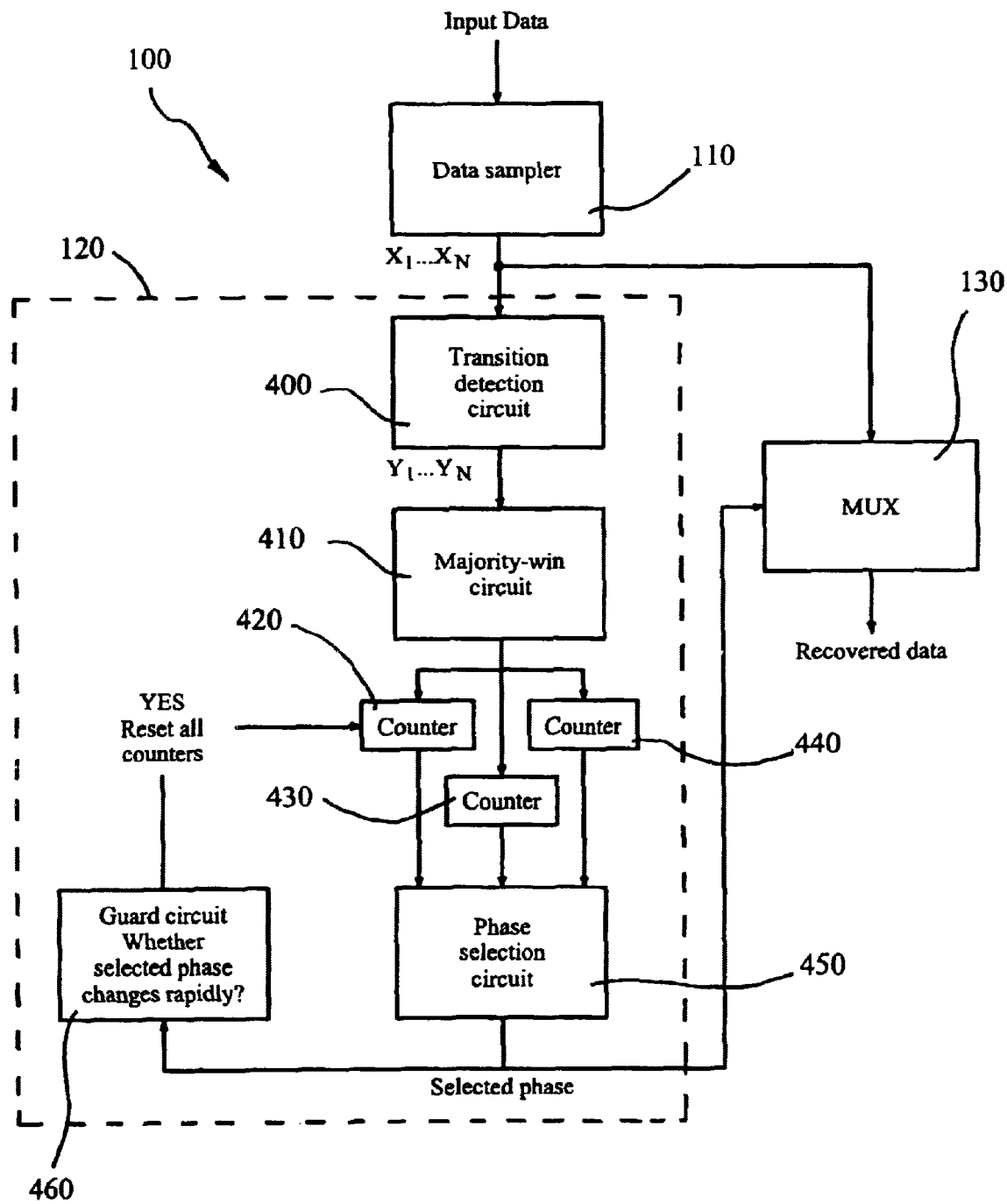
FIG. 4 is a more detailed block diagram of the system of FIG. 1 according to one embodiment.

FIG. 4 is a more detailed block diagram of the system 100 according to one embodiment. The phase decision circuit 120 includes a transition detection circuit 400, a majority-win circuit 410, counters 420, 430, 440, and a phase selection circuit 450. In some embodiments, the phase decision circuit 120 also includes a guard circuit 460.

The transition detection circuit 400 detects transitions between samples, $X_1$ to $X_N$, from the data sampler 110, where N is the number of samples in a clock cycle of the multi-phase clock. In one embodiment, the transition detection circuit 400 includes a plurality of two-input exclusive-OR (XOR) gates, where the two inputs (of each of the gates) are two adjacent samples, $X_i$ and $X_{i+1}$, from the data sampler 110. When two adjacent samples change phase (or transition), such as from low to high or from high to low, the XOR gate outputs a high signal. When there is no change, the XOR gate outputs a low signal. Thus, the XOR gate detects data transitions by outputting a "1" or high signal. In the first embodiment, with 12 samples per clock cycle of the multi-phase clock, the transition detection circuit 400 will output 12 values, with the last value being the XOR value of the $12^{th}$ sample and the first sample (phase) from the next clock cycle of the multi-phase clock. In the second embodiment, with 20 samples per clock cycle of the multi-phase clock, the transition detection circuit 400 will output 20 values, with the last value being the XOR value of the $20^{th}$ sample and the first sample (phase) of the next clock cycle of the multi-phase clock.

The output transition values, $Y_1$ to $Y_N$, from the transition detection circuit 400 are input to the majority-win circuit 410, which determines, from $Y_1$ to $Y_N$, which of the counters 420, 430, or 440 to increment. In one embodiment, for the 12-phase clock discussed above, values $Y_1$ to $Y_{12}$ are sequentially divided into four groups $G_j$, where j equals one to four and where each group $G_j$ has three consecutive values $Y_{3(j-1)+1}$, $Y_{3(j-1)+2}$, and $Y_{3(j-1)+3}$. In alternative embodiments, other numbers of groups may be used and/or j may take on other values. Accordingly, in the illustrated embodiment there will be four groups of three. For each group $G_j$, if the value for $Y_{3(j-1)+1}$ is high, a first accumulator A is increased by one, if the value for $Y_{3(j-1)+2}$ is high, a second accumulator B is incremented, and if the value for $Y_{3(j-1)+3}$ is high, a third accumulator C is incremented.

If the accumulator A ends up with an accumulation greater than or equal to two, then the counter 440 is incremented, where the counter 440 corresponds to phases or samples 3, 6, 9, and 12 of the 12-phase clock. If the accumulator B ends up with an accumulation greater than or equal to two, then the counter 430 is incremented, where the counter 430 corresponds to phases or samples 1, 4, 7, and 10. If the accumulator C ends up with an accumulation greater than or equal to two, then the counter 420 is incremented, where the counter 420 corresponds to phases or samples 2, 5, 8, and 11. Thus, for the set of output values $Y_1$ to $Y_N$, the majority-win circuit 410 may increment only one of the three counters 440, 430, 420 or may increment two of the three counters 440, 430, 420.

In a modified embodiment the majority-win circuit 410 is configured to only increment one of the three counters 440, 430, 420, for the set of output values $Y_1$ to $Y_N$, as follows: If the accumulator A ends up with the highest accumulation for the four groups $G_j$, then the counter 440 is incremented; if the accumulator B ends up with the highest accumulation, then the counter 430 is incremented; and if the accumulator C ends up with the highest accumulation, the counter 420 is incremented.

In another embodiment, for the 20-phase clock discussed above, values $Y_1$ to $Y_{20}$ are sequentially divided into five groups $G_j$, where j equals one to five and where each group $G_j$ has of four consecutive values $Y_{4(j-1)+1}$, $Y_{4(j-1)+2}$, $Y_{4(j-1)+3}$, and $Y_{4(j-1)+4}$. In alternative embodiments, other numbers of groups may be used and/or j may take on other values. Accordingly, for the illustrated embodiment there will be five groups of four. For each group, if the value for $Y_{4(j-1)+1}$ or $Y_{4(j-1)+2}$ is high, a first accumulator A is increased by one, if the value for $Y_{4(j-1)+2}$ or $Y_{4(j-1)+3}$ is high, a second accumulator B is incremented, and if the value for $Y_{4(j-1)+3}$ or $Y_{4(j-1)+4}$ is high, a third accumulator C is incremented. If the accumulator A ends up with the highest accumulation, then the counter 440 is incremented, where the counter 440 corresponds to phases or samples 4, 8, 12, 16, and 20. If the accumulator B ends up with the highest accumulation, then the counter 430 is incremented., where the counter 430 corresponds to phases or samples 1, 5, 9, 13, and 17. If the accumulator C ends up with the highest accumulation, the counter 420 is incremented, where the counter 420 corresponds to phases or samples 2, 6, 10, 14, and 18, and also 3, 7, 11, 15, and 19. Thus, for the output values $Y_1$ to $Y_N$, the majority-win circuit 410 will increment only one of the three counters 440, 430, 420. In this embodiment three counters are used to record transitions for four groups of samples, so that one counter corresponds to more phases than the other counters. In this implementation, the circuit still can converge on the correct group of samples by observing the order of high limit thresholds $HL_i$ (FIG. 5) being activated.

Thus, it has been described how the samples $X_1$ to $X_N$ from the data sampler are used to generate values $Y_1$ to $Y_N$ by the transition detection circuit and, subsequently, how the majority-win circuit 410 increments the counters 420, 430 and 440 based on the values $Y_1$ to $Y_N$.

Figure 5:
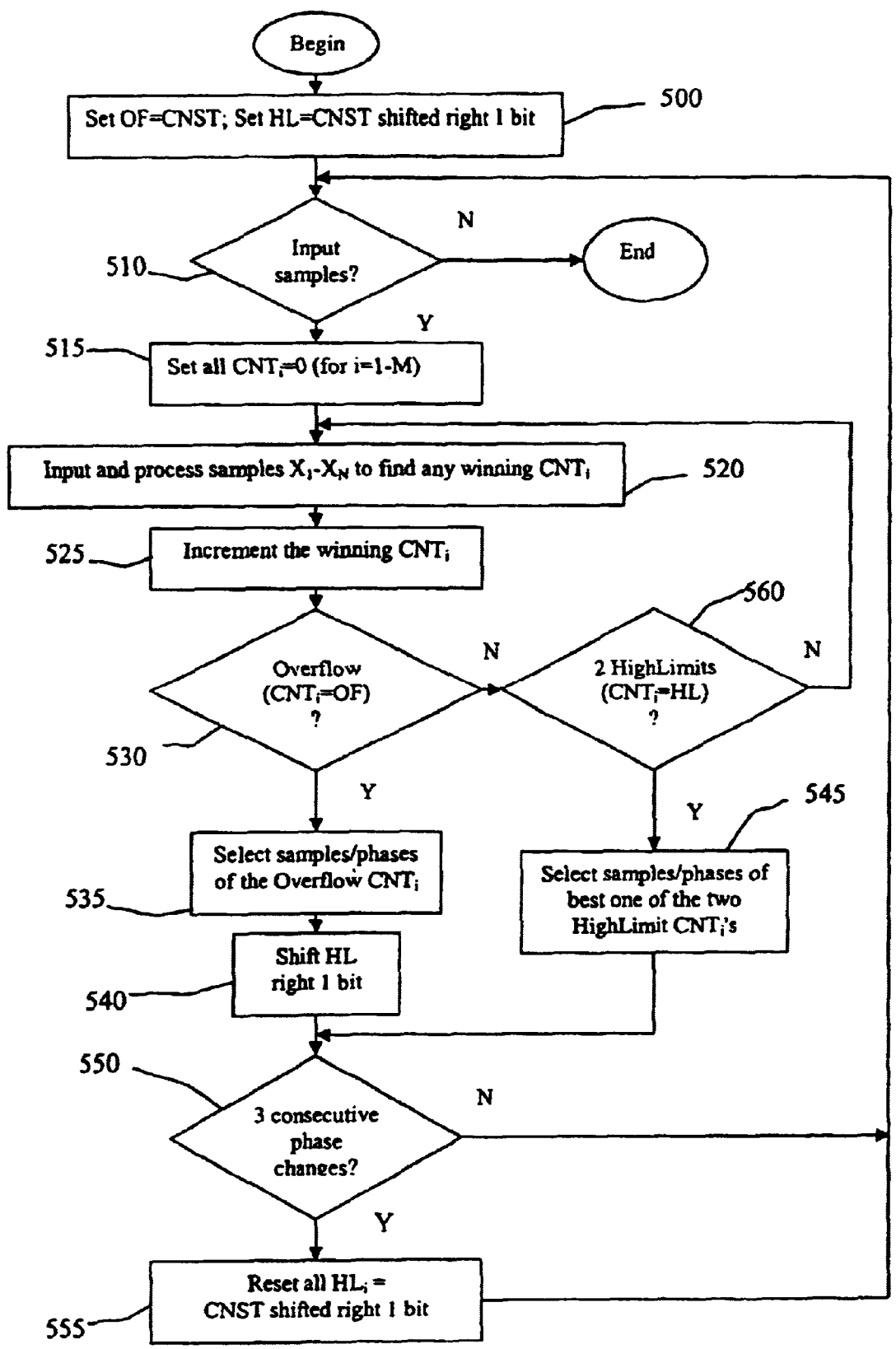
FIG. 5 is a flow chart illustrating a data recovery method in accordance with the present invention.

With reference to FIG. 5, a presently preferred method of the present invention is now described with continuing reference to FIG. 4. At Step 500, a high limit threshold $HL_i$ and an overflow threshold $OF_i$ for each of the counters 420, 430 and 440 are set, where i=1–M. In the illustrated example, M equals three. These threshold values will be discussed in further detail below. The method then encounters a simple decision Step 510 of whether samples should be input and processed. An affirmative decision advances the method to Step 515 where all of the counters 420, 430, and 440 are set to zero. At Step 520 a set of samples $X_1$ to $X_N$ from the data sampler is used to generate the transition values $Y_1$ to $Y_N$ for the subsequent determination of the accumulator(s) with the highest accumulation(s). At Step 525, the counter(s) corresponding to the accumulator(s) with the highest accumulation(s) is incremented.

In accordance with the presently described invention, the incrementing (i.e., changing) values of the counters 420, 430, and 440 will be communicated to the phase selection circuit 450, which processes the various counts. As presently embodied, each of the counters 420, 430, and 440 has two count thresholds. These two thresholds will also be referred to as a high limit threshold (HL) and an overflow threshold (OF). The high limit thresholds are not necessarily the same for each counter, and the overflow thresholds do not need to be the same for each counter. In the illustrated embodiment, however, the high limit and overflow thresholds are the same for all counters.

At Step 500, the high limit threshold is initially set to the binary value equal to the overflow threshold shifted right one bit. In other words, it is set to the second most significant bit (MSB) in binary of the overflow threshold. For example, if the overflow threshold is set as 13, which is 1101 in binary form, then the high limit threshold will be set as 4, which is 0100 in binary form. The overflow threshold can be set according to the requirements of the circuit. Regarding setting of the actual value of the overflow threshold, it can be set in accordance with, for example, design parameters. In certain cases the value of the overflow threshold may be hardware limited. In an example of one 3-bit counter, the overflow threshold is 8, where $8=2^3$. However, it is possible to implement a counter, of which the overflow threshold is programmable. This feasibility can be helpful in debugging the chip. In either case, the circuit itself can change its low pass effect by adjusting the high limit threshold.

Referring to Step 530, the method determines whether the incrementing of the counter(s) in Step 525 has resulted in any overflow conditions. In particular, for the 12-phase clock embodiment discussed above, if the counter 420 reaches the overflow threshold before the counters 430 or 440 reach the high limit threshold, then phases or samples 2, 5, 8, and 11 are selected. If the counter 430 reaches the overflow threshold before the counters 420 or 440 reach the high limit threshold, then the phases or samples 1, 4, 7, and 10 are chosen. Phases or samples 3, 6, 9, and 12 are selected if the counter 440 reaches the overflow threshold before the counters 420 or 430 reach the high limit threshold.

At Step 535, a phase (corresponding to samples) is selected by the phase selection circuit 450 using the above conditions, and the multiplexer 130 then inputs that selected phase from the phase selection circuit 450. The multiplexer then outputs the samples corresponding to that phase from the samples $X_1$ to $X_N$ to thereby recover the data. The high limit threshold is shifted right one bit (for example, 0100→0010) at Step 540, and the method can then return (after Step 550) to Step 510 where the counters 420, 430, and 440 are reset before the processing of another set of samples $X_1$ to $X_N$.

However, if two or more of the counters 420, 430, or 440 reach the high limit threshold before an overflow threshold is reached as shown at 560, then phase or sample selection by the phase selection circuit 450 occurs as Step 545 as follows. Phases or samples 3, 6, 9, and 12 (i.e., 3$i$, where i equals one to four) are selected if the counter 420 reaches the high limit threshold before either of the counters 430 or 440 reach the high limit threshold. Phases or samples 1, 4, 7, and 10 are selected if the counter 430 reaches the high limit threshold before the counters 420 or 440 reach the high limit threshold, and phases or samples 2, 5, 8, and 11 are selected if the counter 440 reaches the high limit threshold before the other counters. Once the phases or samples are chosen, the method can then return (after Step 550) to Step 510 where the counters 420, 430, and 440 are reset before the processing of another set of samples $X_1$ to $X_N$. Here, after Steps 560 and 545, the method does not adjust any high limits before returning to Step 510.

For the 20-phase clock embodiment discussed above, if the counter 420 reaches the overflow threshold before the counters 430 or 440 reach the high limit threshold, then phases or samples 4, 8, 12, 16, and 20 are selected. If the counter 430 reaches the overflow threshold before the counters 420 or 440 reach the high limit threshold, then phases or samples 1, 5, 9, 13, and 17 are chosen. Phases or samples 2, 6, 10, 14, and 18 are selected if the counter 440 reaches the overflow threshold before the counters 420 or 430 reach the high limit threshold. Once phases or samples are selected using the above conditions, the counters 420, 430, and 440 are reset, and the high limit threshold is shifted right by one bit (e.g., 0100→0010).

However, if two or more of the counters 420, 430, or 440 reach the high limit threshold before the overflow threshold is reached, then phase or sample selection for the 20-phase clock is as follows. Phases or samples 4, 8, 12, 16, and 20 are selected if the counter 420 reaches the high limit threshold before the counter 430 reaches the high limit threshold. Phases or samples 1, 5, 9, 13, and 17 are selected if the counter 430 reaches the high limit threshold before the counters 420 or 440 reach the high limit threshold, and phases or samples 2, 6, 10, 14, and 18 are selected if counter 440 reaches the high limit threshold before the counter 430 reach the high limit threshold. Finally, phases or samples 3, 7, 11, 15, and 19 are selected if the counter 420 reaches the high limit threshold before the counter 440 reaches the high limit threshold or if the counter 440 reaches the high limit threshold before the counter 420 reaches the high limit threshold. Once the phases or samples are chosen, the counters are reset, as before.

It will be understood by those skilled in the art that modifications to the 12-phase clock or 20-phase clock embodiment are within the scope of the invention. For example, for an L-phase clock, with M times oversampling, there will be M phases or samples per data bit or interval and L/M bits per clock cycle of the multi-phase clock. Consequently, there can be M accumulators, M counters and L/M groups of data transition values, with each group having M number of data transition values.

In a modified embodiment of the 20-phase clock, a fourth accumulator and a fourth counter can be implemented in which case the operation of the four accumulators and counters would be analogous to the operation of the 12-phase embodiment. More particularly, in this modified embodiment a fourth accumulator D is used in combination with a fourth counter, in which the operation proceeds as follows: if the value for $Y_{4(j-1)+1}$ is high, the first accumulator A is increased by one, if the value for $Y_{4(j-1)+2}$ is high, the second accumulator B is incremented; if the value for $Y_{4(j-1)+3}$ is high, the third accumulator C is incremented; and if the value for $Y_{4(j-1)+4}$ is high, the fourth accumulator D is incremented. If the accumulator A ends up with the highest accumulation (or, alternatively, an accumulation greater than one), then the counter 420 is incremented, where the counter 420 corresponds to phases or samples 3, 7, 11, 15 and 19 (or, alternatively, 4, 8, 12, 16 and 20). If the accumulator B ends up with the highest accumulation (or, alternatively, an accumulation greater than one), then the counter 430 is incremented, where the counter 430 corresponds to phases or samples 4, 8, 12, 16 and 20 (or, alternatively, 1, 5, 9, 13 and 17). If the accumulator C ends up with the highest accumulation (or, alternatively, an accumulation greater than one), the counter 440 is incremented, where the counter 440 corresponds to phases or samples 1, 5, 9, 13 and 17 (or, alternatively, 2, 6, 10, 14 and 18). If the accumulator D ends up with the highest accumulation (or, alternatively, an accumulation greater than one), the forth counter is incremented, where the forth counter corresponds to phases or samples 2, 6, 10, 14, and 18 (or, alternatively, 3, 7, 11, 15 and 19). Thus, in the modified embodiment wherein the majority-win circuit 410 only increments the counter corresponding to the accumulator with the highest count, the majority-win circuit 410 will increment only one of the four counters for the output values $Y_1$ to $Y_N$. However, in the modified embodiment wherein the criteria for the majority-win circuit 410 to increment a counter is when a count is greater than one, then the majority-win circuit 410 may increment one or two of the four counters for the output values $Y_1$ to $Y_N$.

The counters 420, 430, 440 and the fourth counter are input to the phase selection circuit 450, wherein the counter that reaches the overflow threshold before the other counters reach the high limit threshold has its phases or samples selected, followed by the counters being reset and the high limit threshold being shifted right one bit (e.g., 0100→0010), as discussed above. If two or more of the four counters reach the high limit threshold before an overflow threshold is reached, then the counter that reaches the high limit threshold first has its phase or sample selection and the counters are reset as described above.

With any of the above embodiments, the method of the present invention as presently embodied determines whether the selected phase has changed three times in succession at Step 550. Upon a determination that this has occurred, the high limit threshold is reset at Step 555.

Once the phases or samples are selected by phase selection circuit 450, this information is supplied to the multiplexer circuit 130. The multiplexer circuit 130 uses this information to select the desired samples from the data sampler circuit 110. The output of the multiplexer circuit 130 is then the recovered data. The multiplexer circuit 130 is a conventional circuit, which can include a plurality of different or same size multiplexers. Other devices that perform a multiplexing function can also be used, such as multi-input switches.

In accordance with a modified embodiment of the invention, the transition detection circuit 400 detects transitions between samples, $X_1$ to $X_N$, from the data sampler 110, where N is the number of samples in a data frame (as distinguished from the above embodiments wherein N was the number of samples in a clock cycle of the multi-phase clock). Thus, in connection with the 12-phase clock, the transition detection circuit 400 will output 30 values, with the last value being the XOR value of the 30$^{th}$ sample and the first sample from the next clock phase of the multi-phase clock. In the majority-win circuit 410, transition values $Y_1$ to $Y_{30}$ are sequentially divided into 10 groups of three values each. For the 20-phase clock, the transition detection circuit 400 will output 40 values, with the last value being the XOR value of the 40$^{th}$ sample and the first sample of the next clock phase of the multi-phase clock. In this implementation, values $Y_1$ to $Y_{40}$ are sequentially divided into 10 groups of four values each within the majority-win circuit 410. The other operations for these modified embodiments, wherein N is the number of samples in a data frame, are substantially unchanged in relation to the embodiments described above.

The above-described embodiments of the present invention are merely meant to be illustrative and not limiting. It will thus be obvious to those skilled in the art that various changes and modifications may be made without departing from this invention in its broader aspects. For example, in some embodiments the input data can be oversampled by a single clock of a certain frequency and certain number of clock phases. In other modified embodiments, the accumulators and/or counters can be replaced by any kind of known shift registers, of which shift range is tunable. Therefore, the appended claims encompass all such changes and modifications as fall within the true spirit and scope of this invention.

We claim:

1. An oversampling data-recovery apparatus, comprising:
    a data sampler configured to receive a serial data stream with an L-phase clock and to output N samples $X_1$ to $X_N$, with M samples per bit;
    a phase decision circuit comprising a plurality of counters each having at least a first adjustable threshold and a second threshold, wherein the phase decision circuit is configured to receive said plurality of samples and to output phase selection information based on counts stored in said counters; and
    a multiplexer circuit configured to receive the samples $X_1$ to $X_N$ and the phase selection information, wherein the multiplexer circuit selects one of the plurality of samples per bit to output recovered data.

2. The apparatus of claim 1, wherein the phase decision circuit further comprises:
    a transition detection circuit configured to receive the samples $X_1$ to $X_N$, detect transitions between adjacent ones of said samples, and output transition values $Y_1$ to $Y_N$;
    a logic circuit coupled to the transition detection circuit, wherein the logic circuit groups and counts the output transition values, and increments selected ones of the counters based on the counts; and
    a phase selection circuit configured to receive outputs from the counters, wherein the phase selection circuit selects a group of phases from the L-phase clock based on which one of the counters reaches the first or second threshold before the other counters.

3. The apparatus of claim 2, wherein the transition detection circuit comprises a plurality of 2-input exclusive-OR gates, wherein the inputs are successive ones of the samples.

4. The apparatus of claim 2, further comprising a guard circuit coupled between the phase selection circuit and the counters.

5. The apparatus of claim 1, wherein each of the bits is sampled M times, and the serial data stream has L/M bits for each cycle of the L-phase clock.

6. The apparatus of claim 5, wherein the plurality of counters is equal to M, one clock cycle of the L-phase clock is divided into L/M groups of data transition values, and each of the L/M groups has M number of the data transition values $Y_j$.

7. The apparatus of claim 6, wherein L equals 12 and M equals 3.

8. The apparatus of claim 7, wherein a first one of the counters corresponds to the second, fifth, eighth, and eleventh phases of the L-phase clock, a second one of the counters corresponds to the first, fourth, seventh, and tenth phases of the L-phase clock, and a third one of the counters corresponds to the third, sixth, ninth, and twelfth phases of the L-phase clock.

9. The apparatus of claim 8, wherein the first one of the counters is incremented if $Y_{3(j-1)+3}$ has the most high values, the second one of the counters is incremented if $Y_{3(j-1)+2}$ has the most high values, and the third one of the counters is incremented if $Y_{3(j-1)+1}$ has the most high values.

10. The apparatus of claim 1, wherein initially for each of the counters, the first threshold is set to a value of the second threshold shifted right by one bit.

11. The apparatus of claim 10, wherein once any counter reaches the second threshold and one of the plurality of samples per bit is selected, all of the counters are reset and the first threshold for every counter is shifted right by one bit.

12. The apparatus of claim 9, wherein phases corresponding to the first one of the counters are selected if the first one of the counters reaches the second threshold before the second or third one of the counters reaches the first threshold, phases corresponding to the second one of the counters are selected if the second one of the counters reaches the second threshold before the first or third one of the counters reaches the first threshold, and phases corresponding to the third one of the counters are selected if the third one of the counters reaches the second threshold before the first or second one of the counters reaches the first threshold.

13. The apparatus of claim 9, wherein when two or more of the counters reach the first threshold before one of the counters reaches the second threshold, phases corresponding to the first one of the counters are selected if the first one of the counters reaches the first threshold before the second or third one of the counters reaches the first threshold, phases corresponding to the second one of the counters are selected if the second one of the counters reaches the first threshold before the first or third one of the counters reaches the first threshold, and phases corresponding to the third one of the counters are selected if the third one of the counters reaches the first threshold before the first or second one of the counters reaches the first threshold.

14. The apparatus of claim 5, wherein L equals 20, the plurality of counters comprises 3 counters, and M equals 4.

15. A method of recovering oversampled data, comprising:

oversampling by M times an input serial data steam to produce N samples with M samples per bit;

detecting phase transitions between successive ones of the samples;

determining a majority of the phase transitions, wherein the majority corresponds to one sample of the M samples for each bit;

incrementing counters based on the majority of phase transitions; and selecting a set of samples based on a counter reaching an adjustable threshold prior to other counters reaching the adjustable threshold.

16. The method of claim 15, wherein the detecting comprises performing an exclusive-OR operation on successive ones of the samples.

17. The method of claim 15, further comprising:

after the selecting, resetting the counters and shifting a binary value of the adjustable threshold right one bit.

18. The method of claim 15, further comprising dividing the phase transitions into successive groups of M.

19. The method of claim 18, wherein each bit is oversampled 3 times using a 12-phase clock.

20. The method of claim 18, wherein each bit is oversampled 4 times using a 20-phase clock.

21. The method of claim 15, wherein the counters have a first and a second threshold, further comprising initially setting the first threshold to a value of the second threshold shifted right by one bit for each of the counters.

22. The method of claim 21, wherein the selecting is for the counter that reaches the second threshold before the other counters reach the first threshold.

23. The method of claim 15, further comprising a step of monitoring the selecting step to determine when three sets of samples are selected based on the adjustable threshold being reached by different counters three times in succession.

24. The method of claim 23, further comprising a step of resetting counters and the adjustable threshold when it is determined that three sets of samples have been selected based on the adjustable threshold being reached by different counters three times in succession.

* * * * *